United States Patent
Kurihara et al.

(10) Patent No.: US 10,767,046 B2
(45) Date of Patent: Sep. 8, 2020

(54) POLYAMIDE RESIN MOLDED BODY

(71) Applicant: ASAHI KASEI KABUSHIKI KAISHA, Tokyo (JP)

(72) Inventors: Tetsuo Kurihara, Tokyo (JP); Hiroshi Oyamada, Tokyo (JP); Yasuo Kawaji, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/313,331

(22) PCT Filed: Jul. 3, 2017

(86) PCT No.: PCT/JP2017/024404
§ 371 (c)(1),
(2) Date: Dec. 26, 2018

(87) PCT Pub. No.: WO2018/008611
PCT Pub. Date: Jan. 11, 2018

(65) Prior Publication Data
US 2019/0169431 A1    Jun. 6, 2019

(30) Foreign Application Priority Data

Jul. 4, 2016   (JP) ................................. 2016-132617
Oct. 14, 2016   (JP) ................................. 2016-202211

(51) Int. Cl.
| | | |
|---|---|---|
| C08L 77/02 | (2006.01) | |
| C10M 169/04 | (2006.01) | |
| C08L 27/12 | (2006.01) | |
| C08L 77/00 | (2006.01) | |
| C08L 77/06 | (2006.01) | |
| C08L 27/18 | (2006.01) | |
| C10N 20/06 | (2006.01) | |
| C10N 30/02 | (2006.01) | |
| C10N 30/06 | (2006.01) | |
| C10N 50/00 | (2006.01) | |

(52) U.S. Cl.
CPC .............. *C08L 77/02* (2013.01); *C08L 27/12* (2013.01); *C08L 27/18* (2013.01); *C08L 77/00* (2013.01); *C08L 77/06* (2013.01); *C10M 169/041* (2013.01); *C10M 2201/081* (2013.01); *C10M 2213/062* (2013.01); *C10M 2217/0443* (2013.01); *C10N 2020/06* (2013.01); *C10N 2030/02* (2013.01); *C10N 2030/06* (2013.01); *C10N 2050/025* (2020.05)

(58) Field of Classification Search
None
See application file for complete search history.

(56) References Cited

U.S. PATENT DOCUMENTS

| | | | | |
|---|---|---|---|---|
| 5,324,785 | A | * | 6/1994 | Noda .................... C08F 259/08 525/276 |
| 5,494,752 | A | | 2/1996 | Shimizu et al. |
| 2005/0267260 | A1 | | 12/2005 | Frances et al. |
| 2009/0125101 | A1 | | 5/2009 | Zhao |
| 2010/0130690 | A1 | | 5/2010 | Nanba et al. |
| 2012/0296047 | A1 | | 11/2012 | Nanba et al. |
| 2013/0289531 | A1 | | 10/2013 | Pagan et al. |
| 2014/0187721 | A1 | | 7/2014 | Ito et al. |
| 2015/0274961 | A1 | | 10/2015 | Ito et al. |
| 2016/0372240 | A1 | | 12/2016 | Yoshimoto et al. |
| 2017/0154707 | A1 | | 6/2017 | Abe et al. |

FOREIGN PATENT DOCUMENTS

| | | | |
|---|---|---|---|
| CN | 104203298 A | | 12/2014 |
| EP | 2 330 156 A1 | | 6/2011 |
| JP | 1-221437 A | | 9/1989 |
| JP | 6-73137 A | | 3/1994 |
| JP | 7-70944 A | | 3/1995 |
| JP | 8-311333 A | | 11/1996 |
| JP | 2003-340369 A | | 12/2003 |
| JP | 2006-184745 A | | 7/2006 |
| JP | 2007-126631 A | | 5/2007 |
| JP | 2008-501064 A | | 1/2008 |
| JP | 2009-30005 A | | 2/2009 |
| JP | 2010-53326 A | | 3/2010 |
| JP | 2011-84679 A | | 4/2011 |
| JP | 2012-102189 A | | 5/2012 |

(Continued)

OTHER PUBLICATIONS

International Search report from WIPO Patent Application No. PCT/JP2017/024404, dated Oct. 31, 2017.

(Continued)

*Primary Examiner* — Christopher M Rodd
(74) *Attorney, Agent, or Firm* — Greenblum & Bernstein, P.L.C.

(57) ABSTRACT

A polyamide resin molded body is formed by a resin composition having a (B) fluorine series resin within a range from 1 to 15 parts by mass with respect to 100 parts by mass of a (A) polyamide resin. In the resin composition, the number average particle diameter of the fluorine series resin dispersed in the polyamide resin is 0.8 µm or less. The resin composition includes particles of the (B) fluorine series resin having particle diameters of 0.8 µm or greater. The percentage of particles having particle diameters of 0.8 µm or greater which are secondary particles while maintaining the form of primary particles is 60% or greater, and/or the degree of crystallinity of the dispersed (B) fluorine series resin is 42 J/g or greater.

20 Claims, 2 Drawing Sheets

(56) References Cited

FOREIGN PATENT DOCUMENTS

| JP | 2014-59459 A | 4/2014 |
|---|---|---|
| JP | 2014-61398 A | 4/2014 |
| JP | 2015-513953 A | 5/2015 |
| JP | 2015-129243 A | 7/2015 |
| JP | 2015-178614 A | 10/2015 |
| WO | 2007-052664 A1 | 5/2007 |
| WO | 2013/047625 A1 | 4/2013 |
| WO | 2016/031675 A1 | 3/2016 |

OTHER PUBLICATIONS

International Preliminary Report on Patentability for PCT/JP2017/024404, dated Jan. 8, 2019.
Supplementary European Search Report issued in corresponding European patent application No. 17824214 dated Jun. 19, 2019.
Third Party Observations issued in EP Patent App. 17284214.5 dated Mar. 17, 2020.

\* cited by examiner

POLYAMIDE RESIN MOLDED BODY

CROSS REFERENCE TO RELATED APPLICATIONS

This application is a National Phase Entry of PCT International Application No. PCT/JP2017/024404 filed on Jul. 3, 2017, which claims priority under 35 U.S.C § 119(a) to Japanese Patent Application No. 2016-132617 filed on Jul. 4, 2016 and Japanese Patent Application No. 2016-202211 filed on Oct. 14, 2016. Each of the above applications is hereby expressly incorporated by reference, in its entirety, into the present application.

TECHNICAL FIELD

The present disclosure is related to a polyamide resin molded body formed by a polyamide resin composition having superior sliding properties and mechanical properties. More specifically, the present disclosure is related to a polyamide resin molded body formed by molding a polyamide resin composition in which a fluorine series resin is dispersed within a polyamide resin in a specific dispersed state.

BACKGROUND ART

Polyamide resins are widely in use as materials for various parts, such as those for industrial materials, automobiles, electrics and electronics, industrial use, etc. due to them having superior sliding properties, molding processing properties, mechanical properties, and chemical resistance properties.

Compositions in which a solid lubricant such as a fluorine series resin, graphite, and molybdenum disulfide is blended into a polyamide resin and kneaded are known as a means for further improving the sliding properties of polyamide resin. Lately, conversion of metal components into resin components is accelerating in the automotive field, the electric and electronic field, etc. Particularly recently, molding materials having more superior sliding properties as well as superior mechanical properties such as toughness and impact resistance are in demand in the automotive field, from the viewpoints of weight reduction to improve fuel efficiency, cost reduction, and streamlining of assembly processes.

For example, International Patent Publication No. WO 2013/047625 proposes a resin composition as a technique for further improving the sliding properties of a polyamide resin. In this resin composition, a hard resin and a fluorine series resin having close melting points are melt kneaded under high shear conditions, to adjust the maximum dispersed particle diameter of the fluorine series resin to be 950 nm or less.

In addition, Japanese Unexamined Patent Publication No. 2011-84679 proposes a sliding member for a power transmission guide formed by a resin composition. The resin composition is formed by blending a fluorine series resin, which has been modified by electron beam irradiation, into a base material resin, and then conducting reactive extrusion.

Further, Japanese Unexamined Patent Publication No. 2012-102189 proposes a composition having improved sliding properties. This composition is produced by blending a siloxane compound and a fluorine series resin into a polyamide resin, and then melt kneading.

SUMMARY

Technical Problem

However, in the method described in International Patent Publication No. WO 2013/047625, in the case that polytetrafluoroethylene as the fluorine series resin, for example, in order to finely disperse it, it is necessary to conduct melt kneading at the melting point of polytetrafluoroethylene or a higher temperature under high shear conditions, and there is a problem that mechanical strength decreases due to deterioration of the polyamide resin.

In addition, it is necessary for the composition produced by the method described in Japanese Unexamined Patent Publication No. 2011-84679 to be denatured by electron beam irradiation of the fluorine series resin, which is complicated, and there is a concern that cost will be increased, as well as a possibility that the characteristics of the fluorine series resin will be impaired.

Furthermore, the composition prepared by the method disclosed in Japanese Unexamined Patent Publication No. 2012-102189 improves sliding properties by using a combination of a siloxane compound and a fluorine series resin, but improvement of sliding properties by fluorine series resin alone is not considered.

The present disclosure has been developed in view of the foregoing circumstances. The present disclosure provides a comparatively low cost polyamide resin molded body having more superior sliding properties and mechanical properties, by finely dispersing a fluorine series resin in a polyamide resin.

As a result of intensive study in order to obtain the above polyamide resin molded body, the present inventors discovered that the above polyamide resin molded body can be obtain by a molded body molded employing a polyamide resin composition in which the number average particle diameter of the fluorine series resin dispersed in the polyamide resin is 0.8 μm or less, and the content of particles which are secondary particles while maintaining the form of primary particles that is observed in the fluorine series resin powder is 60% or greater, and/or the degree of crystallinity of the dispersed (B) fluorine series resin is 42 J/g or greater. Thus, the present disclosure was completed.

That is, the polyamide resin molded body of the present disclosure is a polyamide resin molded body formed by a resin composition having the (B) fluorine series resin within a range from 1 to 15 parts by mass with respect to 100 parts by mass of the (A) polyamide resin, in which the number average particle diameter of the fluorine series resin dispersed in the polyamide resin is 0.8 μm or less, which includes particles of the dispersed (B) fluorine series resin having particle diameters of 0.8 μm or greater, and the percentage of particles having particle diameters of 0.8 μm or greater which are secondary particles while maintaining the form of primary particles that is observed in the fluorine series resin powder is 60% or greater, and/or the degree of crystallinity of the dispersed (B) fluorine series resin is 42 J/g or greater.

It is preferable for the distances among particles of the (B) fluorine series resin which are dispersed within the (A) polyamide resin to be 3 μm or less.

It is preferable for the (B) fluorine series resin to be polytetrafluoroethylene.

It is preferable for the (B) fluorine series resin to be that in which a fluorine series resin powder having number average primary particle diameters within a range from 0.1 to 0.8 μm is blended.

It is preferable for the percentage of the number of particles having particle diameters of 1.0 μm or less in the dispersed (B) fluorine series resin to be 70% or greater.

It is preferable for the (A) polyamide resin to be a polyamide resin having one of polyamide 66, polyamide 6, polyamide 610, and polyamide 612 as its principal component.

It is preferable for the relative viscosity in sulfuric acid of the (A) polyamide resin to be within a range from 3.2 to 4.5.

According to the present disclosure, a polyamide resin molded body having superior sliding properties as well as a superior balance with mechanical properties such as toughness and impact resistance can be obtained.

DESCRIPTION OF EMBODIMENTS

Figure 1:
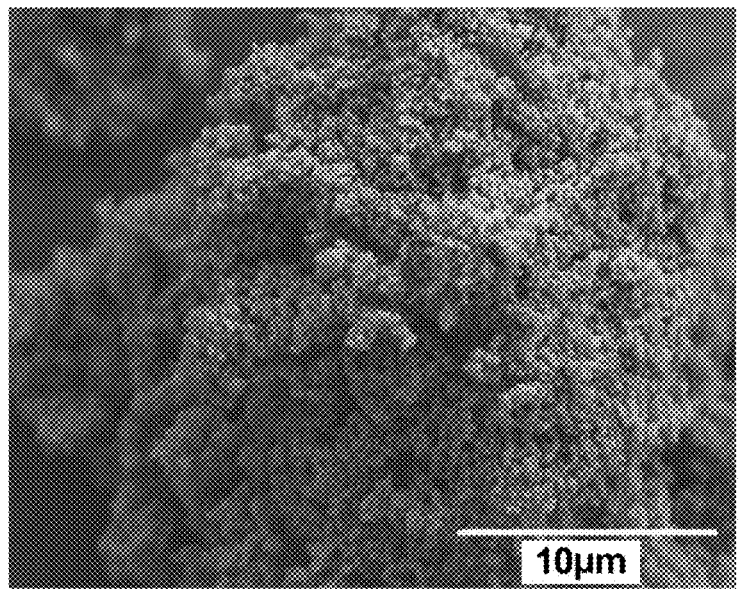
FIG. 1 is an SEM photograph that illustrates the particle form of polytetrafluoroethylene powders (PTFE-1) of an Example of the present disclosure.

Hereinafter, the present disclosure will be described in detail.

A polyamide resin molded body of the present disclosure is a molded body formed by a polyamide resin composition having a (B) fluorine series resin within a range from 1 to 15 parts by mass with respect to 100 parts by mass of a (A) polyamide resin, in which the number average particle diameter of the (B) fluorine series resin dispersed in the polyamide resin is 0.8 μm or less, which includes particles of the dispersed (B) fluorine series resin having particle diameters of 0.8 μm or greater, and the percentage of particles having particle diameters of 0.8 μm or greater which are secondary particles while maintaining the form of primary particles that is observed in the fluorine series resin powder is 60% or greater, and/or the degree of crystallinity of the dispersed (B) fluorine series resin is 42 J/g or greater.

Hereinafter, each of the constituent components which is employed in the polyamide resin molded body of the present disclosure will be described.

(A) Polyamide Resin

Examples of the (A) polyamide resin include, for example, a polyamide obtained by ring opening polymerization of lactam, a polyamide obtained by self condensation of ω-aminocarboxylic acid, a polyamide obtained by condensing diamine and dicarboxylic acid, and polymers thereof. However, the (A) polyamide resin is not limited to these examples.

In addition, only one type of the above polyamides may be employed singly as the (A) polyamide resin, or a mixture of two or more types may be employed.

Examples of the (A) polyamide resin include, but are not limited to, for example, polyamide 4 (poly α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610 (polyhexamethylene sebacamide), polyamide 612 (polyhexamethylene dodecamide), polyamide 6T (polyhexamethylene terephthalamide), polyamide 9T (polynonanemethylene terephthalamide), polyamide 6I (polyhexamethylene isophthalamide), polyamide 2Me5T (poly-2-methylpentamethylene terephthalamide (Me is a methyl group; the same applies hereinafter)), polyamide MXD6 (polymethaxylene adipamide), and polyamide PXD12 (polyparaxylylene dodecamide), as well as one or more types of polyamide resins, etc. selected from a group consisting of copolymer polyamides having at least at least one of these types as constituent components.

A polyamide resin having polyamide 66, polyamide 6, polyamide 610, or polyamide 612 as a principle component is preferable from the viewpoint of sliding properties. Here, the expression "principal component" means that the amount of polyamide 66, polyamide 6, polyamide 610, or polyamide 612 which is included in the polyamide resin is 50% by mass or greater.

Further, from the viewpoint of heat resistance properties, a polyamide resin containing polyamide 66 and polyamide PXD 12 as a principle component is preferable, and a polyamide resin containing polyamide 66 as a principle component is most preferable.

It is preferable for the relative viscosity in sulfuric acid of the (A) polyamide resin to be 2.0 or greater, more preferably 2.1 or greater, still more preferably 2.3 or greater, and it is most preferable for the (A) polyamide resin to have a relative viscosity in sulfuric acid of 3.2 or greater. In addition, it is preferable for the relative viscosity in sulfuric acid of the (A) polyamide resin to be 4.5 or less, more preferably 4.4 or less, and most preferably 4.3 or less.

By the relative viscosity of the (A) polyamide resin in sulfuric acid being 2.0 or greater, there is a tendency for a polyamide resin molded body having more superior mechanical properties to be obtained. In addition, by the relative viscosity of the (A) polyamide resin in sulfuric acid being 4.5 or less, there is a tendency for a polyamide resin composition having more superior flow properties and processing properties to be obtained.

The relative viscosity in sulfuric acid can be measured by a method according to JIS-K6920 indicated in the Examples.

(B) Fluorine Series Resin

Examples of the (B) fluorine series resin include, in addition to polytetrafluoroethylene (PTFE), tetrafluoroethylene-perfluoroalkylvinylether copolymer (PFA), tetrafluoroethylene-hexafluoropropylene copolymer (FEP), tetrafluoroethylene-ethylene copolymer (ETFE), and polychlorotrifluoroethylene (PCTFE), etc. Polytetrafluoroethylene is preferable from the viewpoint of sliding properties.

It is preferable for the content of the (B) fluorine series resin to be within a range from 1 to 15 parts by mass, preferably a range from 2 to 12 parts by mass, more preferably a range from 3 to 10 parts by mass, and even more preferably a range from 4 to 7 parts by mass with respect to 100 parts by mass of the (A) polyamide resin. By the content of the (B) fluorine series resin being 1 part by mass or greater, the sliding properties are exhibited effectively, and by the content of the (B) fluorine series resin being 15 parts by mass or less, abrasion resistance and mechanical properties are improved.

The (B) fluorine series resin is in the form of particles which are dispersed in the (A) polyamide resin with a number average particle diameter of 0.8 μm or less, which includes particles of the (B) fluorine series resin having particle diameters of 0.8 μm or greater, and the percentage of particles having particle diameters of 0.8 µm or greater which are secondary particles while maintaining the form of primary particles that is observed in the fluorine series resin powder is 60% or greater, and/or the degree of crystallinity of the dispersed (B) fluorine series resin is 42 J/g or greater.

Primary particles are the smallest unit particles which are observed by a scanning electron microscope (SEM) when observing the fluorine series resin powder. Secondary particles are particles of shapes in which a plurality of primary particles are collected and aggregated. To be aggregated means that a great number of small particles are collected to become an aggregated mass. Particles which are secondary particles while maintaining the form of primary particles refer to particles which are present within resin as secondary particles without the primary particles of the fluorine series resin that is utilized bonding with each other by melting or the like. Such particles are considered to become smaller by the secondary particles of the fluorine series resin powder disintegrating, but will not disintegrate down to primary particles, and are present within the resin as secondary particles.

The number average particle diameter of the (B) fluorine series resin which is dispersed in the (A) polyamide resin is 0.8 µm or less. It is preferable for the number average particle diameter of the (B) fluorine series resin to be within a range from 0.1 to 0.8 µm, and more preferably a range from 0.2 to 0.7 µm. By the number average particle diameter of the (B) fluorine series resin being 0.8 µm or less, sliding properties and mechanical properties are sufficiently exhibited. The number average particle diameter of the dispersed (B) fluorine series resin is obtained by photographing the polyamide resin molded body at three arbitrary fields of view with a scanning electron microscope (SEM) at 5,000× magnification, measuring particle diameters which can be observed, and obtaining a dispersed particle diameter distribution. The number average particle diameter is the 50% cumulative value from the small particle side of the obtained dispersed particle diameter distribution.

The (B) fluorine series resin which is dispersed in the (A) polyamide resin includes particles of the dispersed (B) fluorine series resin having particle diameters of 0.8 µm or greater. It is preferable for the percentage of particles having particle diameters of 0.8 µm or greater which are secondary particles while maintaining the form of primary particles to be 60% or greater, more preferably 70% or greater, still more preferably 80% or greater, and yet still more preferably 90% or greater. There are cases in which the particles of the (B) fluorine series resin dispersed in the (A) polyamide resin having particle diameters of 0.8 µm or greater include particles which are partially melted, adhered, and enlarged. However, there is a tendency for sliding properties to be sufficiently exhibited by these particles being of shapes which are aggregated while maintaining the form of primary particles. The shapes of the particles having particle diameters of 0.8 µm or greater are performed by observing arbitrary dispersed particles in the polyamide resin molded body with a scanning electron microscope (SEM) at 10,000× magnification. Secondary particles which are formed by aggregated primary particles are counted as one particle.

It is preferable for the degree of crystallinity of the (B) fluorine series resin dispersed in the (A) polyamide resin to be 42 J/g or greater, more preferably 43 J/g or greater, and still more preferably 45 J/g or greater. The crystallinity of the (B) fluorine series resin dispersed in the (A) polyamide resin can be measured with a differential scanning calorimeter (DSC), and is the value of ΔH (J/g) of the melting peak of the fluorine series resin which is obtained when the temperature of the (B) fluorine series resin is raised from a low temperature to a high temperature divided by the content (%) of the (B) fluorine series resin (B). The degree of crystallinity of the (B) fluorine series resin can be increased by conducting polymerization by emulsion polymerization or by not applying a temperature higher than the melting temperature of the (B) fluorine series resin when preparing the resin composition.

It is preferable for the distances among the particles of the (B) fluorine series resin dispersed in the (A) polyamide resin to be 3 µm or less. It is more preferable for the distances among the particles of the (B) fluorine series resin dispersed in the (A) polyamide resin to be in a range from 0.5 to 2.5 µm. By the distances among particles being 3 µm or less, there is a tendency that the sliding properties and mechanical properties will be exhibited more sufficiently. The distances among particles of the dispersed (B) fluorine series resin are values which are obtained by removing 18 µm of the surface layer of the polyamide resin molded body, photographing three arbitrary fields of view with a scanning electron microscope (SEM) at 5,000× magnification, obtaining the positions of the centers of gravity of observable particles with an image analysis device, measuring the distances among the centers of gravity of the particles, and averaging the measured values.

A preferred form of the fluorine series resin is a fluorine series resin powder. The shape of the particles of the fluorine series resin powder is that in which primary particles aggregate to form a secondary particle shape. There is a tendency that the percentage of particles which have become secondary particles while maintaining the aspect of primary particles can be favorably adjusted, by employing the fluorine series resin powder having this shape and performing kneading.

As another preferred form of the fluorine series resin, if the fluorine series resin is in the state of a water dispersed solution, it will not aggregate, which is preferable.

Fine dispersion of the fluorine series resin will become possible by employing the fluorine series resin powder and/or the fluorine series resin in the state of a water dispersed solution.

Any production method may be to produce the fluorine series resin powder as long as the particle shape described above is achieved. However, it is preferable to utilize a powder obtained by polymerization by an emulsion polymerization method, coagulation, cleansing, separation, and drying. Alternatively, an emulsion which is dispersed in water after polymerization may be utilized.

It is preferable for the number average primary particle diameter of the fluorine series resin powder to be 0.8 µm or less. From the viewpoint of an improvement effect on sliding properties, it is preferable for the number average primary particle diameter to be within a range from 0.1 µm to 0.8 µm, more preferably a range from 0.12 µm to 0.75 µm, and most preferably a range from 0.15 µm to 0.6 µm. The number average primary particle diameter of the fluorine series resin powder is a value which is obtained by observing secondary aggregated particles with a scanning electron microscope (SEM) at 10,000× magnification, measuring the long diameters (the diameter of the longest part of the particles) of 50 primary particles, and averaging the measured values.

The secondary particle diameter of the fluorine series resin powder cannot be unconditionally determined because it is influenced by the ease of disintegration, the degree of the ease of aggregation, as well as by the measurement method and the dispersion method. However, it is preferable for the volume average particle diameter to be within a range of 2 μm to 20 μm, from the viewpoint of powder handling properties. Furthermore, the volume average particle diameter is an average value measured employing a laser diffraction type particle diameter distribution measuring apparatus.

It is preferable for the apparent density of the fluorine series resin powder to be within a range from 0.20 to 0.45 g/ml, more preferably a range from 0.23 to 0.42 g/ml, and still more preferably 0.25 to 0.40 g/ml. It is preferable for the apparent density to be 0.20 g/ml or greater from the viewpoint of handling properties of the powder, and preferable for the apparent density to be 0.45 g/ml or less from the viewpoints of disintegration properties and fine dispersion of the secondary particles. Furthermore, the apparent density is measured in an environment at a temperature of 23° C. and a humidity of 50%.

In the case that the fluorine series resin is polytetrafluoroethylene, it is preferable for the powder, which is obtained by coagulation, cleansing, separation, and drying after polymerization, to be utilized without treatment such as firing or application of a functional group by electron beam irradiation. Firing refers to a heating process of polytetrafluoroethylene after polymerization at a temperature higher than the melting point thereof. Thereby, the sliding properties imparted by the fluorine series resin will be sufficiently exhibited.

Although the fluorine series resin may be utilized at any molecular weight, in the case that the fluorine series resin is polytetrafluoroethylene, it is preferable for the number average molecular weight to be 600,000 or less, more preferably within a range from 2,000 to 500,000, and still more preferably within a range from 3,000 to 400,000. By the number average molecular weight of polytetrafluoroethylene being 600,000 or less, fibrillation of polytetrafluoroethylene can be suppressed, and as a result, fine dispersion will become possible.

Note that measurement of the molecular weight of a resin insoluble in a solvent, typified by polytetrafluoroethylene, is based on the method of S. Wu (Polymer Engineering & Science, 1988, Vol. 28, 538 and Polymer Engineering & Science, 1989, Vol. 29, 273). In this method, the number average molecular weight, the weight average molecular weight and the molecular weight distribution are calculated from the elastic modulus of a resin when melted. The viscoelasticity of a resin at 380° C. is measured using a viscoelasticity measuring apparatus RDS-2 by Rheometrics as a measuring device. However, a parallel plate is used as a jig for holding a sample, the thickness of the sample when melted is 1.4 to 1.5 mm, and the frequency range is from 0.001 to 500 rad/sec. In addition, the amount of deformation of the sample during melting is selected from a range from 0.8 to 3% on a circumference with respect to the thickness of the sample when the frequency is 1 rad/sec or greater, and selected from a range from 2 to 10% when the frequency is 1 rad/sec or less. In addition, the sampling frequency of measured values is set to 5 points per digit at the same logarithmic intervals. Further, in two consecutive measurements, measurements are repeated until the average deviation of the stored elastic modulus (G'($\omega$)) at each measurement frequency ($\omega$) becomes 5% or less. Employing the frequency ($\omega$) and the stored elastic moduli (G'($\omega$)) obtained by the measurements, the number average molecular weight (Mn) is determined according to the method of S. Wu (Polymer Engineering & Science, 1988, Vol. 28, 538 and Polymer Engineering & Science, 1989, Vol. 29, 273). However, time t is designated to be t=1/$\omega$ and G(t)=G'($\omega$).

In addition, it is preferable for the percentage of the number of particles of the (B) fluorine series resin, which are dispersed in the (A) polyamide resin, having particle diameters of 1.0 μm or less to be 70% or greater, more preferably 75% or greater, and still more preferably 80% or greater. In the case that the percentage is 70% or greater, there is a tendency for sliding properties and mechanical properties to be sufficiently exhibited.

The percentage of the number of particles of the (B) fluorine series resin, which are dispersed in the (A) polyamide resin, having particle diameters of 1.0 μm or less is a value that can be measured in a molded body. Three fields of view of the molded body are photographed by a scanning electron microscope at 5000× magnification, the long diameters of observable particles are measured, and a dispersed particle diameter distribution is obtained. The number of particles having particle diameters of 1.0 μm or less is counted, and the value is calculated from the percentage of the counted number with respect to the total number of particles.

It is preferable for the particle diameter at 95% of the cumulative total number of the dispersed particle diameter distribution of (B) fluorine series resin dispersed in (A) polyamide resin to be 3.0 μm or less. A range from 0.1 to 3.0 μm is preferable, and a range from 0.2 to 2.8 μm is more preferable. By the particle diameter at 95% of the cumulative total number being 3.0 μm or less, there is a tendency for sliding properties to be sufficiently exhibited.

(Thermal Stabilizing Agent)

It is preferable for a thermal stabilizing agent to be added to the polyamide resin composition.

The thermal stabilizing agent is not particularly limited, and may be, or example, phenol series stabilizing agents such as a hindered phenol compound, phosphite series stabilizing agents, hindered amine series stabilizing agents, triazine series stabilizing agents, and sulfur series stabilizing agents, etc.

In addition, it is also preferable for a copper halide and/or metal halide to be included. It is preferable to use a combination of a copper halide and a metal halide because such a combination results in a greater thermal stabilizing effect being obtained. It is preferable for the molar ratio (halogen/copper) between the halogen content and the copper content to be within a range from 2/1 to 50/1 when the copper compound and the metal halide are included in the polyamide resin composition as a combination. The molar ratio (halogen/copper) of the halogen content to the copper content is more preferably 2/1 to 40/1, and still more preferably 5/1 to 30/1. Note that here, the term "halogen" refers to means the sum of a halogen derived from a copper halide and a halogen derived from a metal halide when copper halide is used as a copper compound.

If the molar ratio between the halogen content and the copper content is 2/1 or greater, copper precipitation and metal corrosion can be suppressed, which is preferable. In addition, if the molar ratio between the halogen content and the copper content is 50/1 or less, it is possible to suppress the problem of corrosion of screws and the like of a molding apparatus without impairing mechanical properties such as toughness and rigidity.

One type of these thermal stabilizing agents may be employed, or combinations of two or more types may be employed.

It is preferable for the amount of the thermal stabilizing agent to be added to be within a range from 0.005 to 5 parts by mass with respect to 100 parts by mass of the polyamide resin, more preferably a range from 0.1 to 3 parts by mass, and still more preferably a range from 0.015 to 2 parts by mass.

(Molding Property Improving Agent)

A molding property improving agent may be added to the polyamide resin composition, if necessary, to the extent that the purpose of the present disclosure is not impaired.

The molding property improving agent is not particularly limited, and examples thereof include higher fatty acids, higher fatty acid metal salts, higher fatty acid esters, higher fatty acid amides, etc.

Examples of high fatty acids include saturated or unsaturated, linear or branched aliphatic monocarboxylic acids etc., having 8 to 40 carbon atoms, such as stearic acid, palmitic acid, behenic acid, erucic acid, oleic acid, lauric acid, montanic acid, etc.

Among these, stearic acid and montanic acid are preferable.

High fatty acid metal salts are metal salts of the above higher fatty acids.

As the metal element of the metal salt, elements belonging to groups 1, 2 and 3 of the Periodic Table of the Elements, zinc, aluminum, etc. are preferable. Group 1 and 2 elements such as calcium, sodium, potassium and magnesium, and aluminum, etc. are more preferable.

The higher fatty acid metal salts may be, for example, calcium stearate, aluminum stearate, zinc stearate, magnesium stearate, calcium montanate, sodium montanate, calcium palmitate, etc.

Among these, metal salts of montanic acid and metal salts of stearic acid are preferable.

Higher fatty acid esters are esterified products of the above higher fatty acid and alcohol. Esters of aliphatic carboxylic acids having 8 to 40 carbon atoms and aliphatic alcohols having 8 to 40 carbon atoms are preferred. The aliphatic alcohol may be, for example, stearyl alcohol, behenyl alcohol, lauryl alcohol, etc. The higher fatty acid esters may be, for example, stearyl stearate, and behenyl behenate, etc.

Higher fatty acid amides are amide compounds of the above higher fatty acids.

The higher fatty acid amides, may be, for example, stearic acid amide, oleic acid amide, erucic acid amide, ethylene bis stearyl amide, ethylene bis oleyl amide, N-stearyl stearyl amide, N-stearyl erucic acid amide, etc.

One type of these higher fatty acids, higher fatty metal salts, higher fatty acid esters, and higher fatty acid amides may be respectively employed singly, or combinations of two or more types may be employed.

(Coloring Agent)

A coloring agent may be added to the polyamide resin composition as necessary, within a range that will not impede the objective of the present disclosure.

The coloring agent is not particularly limited, and may be, for example, dyes such as nigrosine; pigments such as titanium oxide and carbon black; metal particles of aluminum, colored aluminum, nickel, tin, copper, gold, silver, platinum, iron oxide, stainless steel, and titanium; and metal pigments such as mica pearl pigment and color graphite; etc.

(Other Resins)

Other resins may be added to the polyamide resin composition as necessary, within a range that will not impede the objective of the present disclosure.

Such resins are not particularly limited, and examples thereof include the thermoplastic resins, rubber components, etc. to be described below.

Examples of thermoplastic resins include polystyrene series resins such as atactic polystyrene, isotactic polystyrene, syndiotactic polystyrene, AS (Acrylonitorile Styrene) resin, and ABS (Acrylonitorile Butadiene Styrene) resin; acrylic series resins such as polyacrylic acid, polyacrylic acid ester, and polymethyl methacrylate; and halogen containing vinyl compound series resins such as polyvinyl chloride and polyvinylidene chloride. One type of these thermoplastic resins may be employed singly, or combinations of two or more types may be employed.

Examples of the rubber component include natural rubber, polybutadiene, polyisoprene, polyisobutylene, neoprene, polysulfide rubber, thiokol rubber, acrylic rubber, urethane rubber, silicone rubber, epichlorohydrin rubber, styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer, styrene-ethylene-butylene random copolymer, ethylene-propylene copolymer (EPR), ethylene-(1-butene) copolymer, ethylene-(1-hexene) copolymer, ethylene-(1-octene) copolymer, ethylene-propylene-diene copolymer (EPDM), core shell type rubbers such as butadiene-acrylonitrile-styrene-core shell rubber (ABS), methyl methacrylate-butadiene-styrene core shell rubber (MB S), methyl methacrylate-butyl acrylate-styrene core shell rubber (MAS), octyl acrylate-butadiene-styrene core shell rubber (MABS), alkyl acrylate-butadiene-acrylonitrile-styrene core shell rubber (AABS), butadiene-styrene-core shell rubber (SBR), and siloxane containing core shell rubbers represented by methyl methacrylate-butyl acrylate siloxane, etc.

One type of these rubber components may be employed singly, or combinations of two or more types may be employed.

(Production Method for Polyamide Resin Molded Body)

The production method for the polyamide resin molded body of the present disclosure is not particularly limited. The molded body can be obtained by molding a resin composition which is produced by mixing and kneading the (A) polyamide resin, the (B) fluorine series resin, and other components which are blended according to necessity in an arbitrary order.

It is preferable for the production method for the polyamide resin composition to be melt kneading employing various extruding apparatuses which are generally employed, such as a single screw or a twin screw extruding apparatus, and a method that employs a twin screw extruding apparatus is particularly preferable from the viewpoints of productivity, versatility, etc. At this time, it is preferable for the melt kneading temperature to be adjusted such that the temperature of the molten resin discharged from the extruding apparatus outlet is the melting point of the polyamide resin or greater and the melting point of fluorine series resin or less, depending on the type of the polyamide resin. By setting the melt kneading temperature within the above range, failure of extrusion kneading will become less likely to occur and fine dispersion of the fluorine series resin will become possible.

In the case that a twin screw extruding apparatus is employed, the extruding apparatus screw preferably has a kneading zone in which at least two kneading discs are combined. The kneading zone is a region that imparts high shear while suppressing the progression of molten resin in the extrusion direction such that effective kneading is conducted. It is preferable for a melt kneading method, in which the polyamide resin is supplied from a feed port at the most upstream side of the twin screw extruding apparatus, the polyamide resin is melted in a first kneading zone (hereinafter referred to as a melting zone), the fluorine series resin powder is supplied from a side feed port provided downstream of the melting zone, and the non molten fluorine series resin to be dispersed in the molten polyamide resin in a second kneading zone (hereinafter referred to as a kneading zone) provided after the side feed port. It is more preferable for the fluorine series resin to be added to a molten (liquid state) polyamide resin in the state of a water dispersed fluorine series resin. By using fluorine series resin as a water dispersed solution, aggregation of fluorine series resin can be suppressed.

If the fluorine series resin powder is supplied with the polyamide resin from the feed port at the most upstream portion, the temperature of the resin will become higher than the set temperature due to shear heat generation in the melting zone of polyamide resin. Therefore, the temperature will be higher than the melting point of the fluorine series resin in the melting zone, the fluorine series resin powder will melt and aggregate, and fine dispersion cannot be expected.

When supplying the fluorine series resin powder from the side feed port, it is preferable for the side feed port to be provided as much toward the downstream side as possible. The resin temperature is high in the vicinity of the melting zone and there is a possibility that the fluorine series resin powder will melt and aggregate, so it is preferable to avoid the vicinity of the melting zone.

When the fluorine series resin is employed as a water dispersed solution, it is preferable to dispose a liquid jet nozzle after the melting zone and to add the fluorine series resin water dispersed solution with pressure.

It is desirable for each of the conditions of the extruding apparatus (barrel temperature, screw rotation speed, discharge amount, etc.) to be adjusted such that the resin temperature of the composition which is discharged from the outlet of the extruding apparatus after melt kneading the polyamide resin and the fluorine series resin is higher than the crystallization temperature of polyamide resin and 310° C. or less. By setting the resin temperature at the discharge port to 310° C. or less, melting and aggregation of the fluorine series resin is suppressed, the fluorine series resin can be finely dispersed, and the degree of crystallinity of the (B) fluorine series resin can be maintained high.

It is preferable for the resin temperature to be measured, for example, by directly contacting a detecting portion of a generally commercially available thermocouple type thermometer to molten resin which is discharged from the extruding apparatus outlet.

It is preferable for the temperature settings of the extruding apparatus to be changed up to the melting zone and at the melting zone and downstream thereof in order to achieve the aforementioned resin temperature. It is preferable for the temperature to be set within a range from 5° C. to 45° C. higher than the melting point of the polyamide resin up to the melting zone, more preferably a range from 7° C. to 40° C. higher than the melting point, and still more preferably a range from 10° C. to 30° C. higher than the melting point.

It is preferable for the temperature setting at the melting zone and downstream thereof to be set to a temperature range from 10° C. higher than the crystallization temperature of the polyamide resin to 290° C., more preferably a temperature range from 15° C. higher than the crystallization temperature to 285° C., and still more preferably a temperature range from 20° C. higher than the crystallization temperature to 280° C. By setting the set temperature to be 10° C. higher than the crystallization temperature, solidification of the polyamide resin will be suppressed and extrusion can be easily performed. In addition, the fluorine series resin can be finely dispersed by causing the set temperature to be 290° C. or lower.

The polyamide resin molded body of the present disclosure can be obtained by molding the polyamide resin composition.

The method for obtaining the molded body is not particularly limited, and known molding methods can be used.

Examples of such known molding methods include molding methods such as extrusion molding, injection molding, vacuum molding, blow molding, injection compression molding, decorative molding, other material molding, gas assist injection molding, foam injection molding, low pressure molding, ultra thin wall injection molding (ultra high speed injection molding), and in mold composite molding (insert molding or outsert molding), etc.

It is preferable for the set temperature of the molding apparatus when molding the polyamide resin molded body of the present disclosure to be set in the range from 5° C. higher than the melting point of the polyamide resin, which is utilized, to 310° C., more preferably a range from 10° C. higher that the melting point to 300° C., and still more preferably a range from 15° C. higher than the melting point to 295° C. Melting and aggregation of the fluorine series resin during melting and injection of the polyamide resin composition can be suppressed by causing the set temperature of the molding apparatus to be 310° C. or less, and dispersion of the fluorine series resin in the molded body can become sufficient.

The polyamide resin molded body of the present disclosure has superior sliding properties and also has a superior balance of mechanical properties such as toughness and impact resistance. Therefore, so it can be employed for various sliding applications.

For example, bearings, gears, thrust washers, seal rings, etc. are sliding members, and the polyamide resin molded body of the present disclosure can be favorably employed as such members.

EXAMPLES

Hereinafter, the present disclosure will be described in detail with reference to specific Examples and Comparative Examples. However, the present disclosure is not limited to the Examples below. Note that the raw materials which were employed in the Examples and Comparative Examples, as well as the measurement methods for physical property tests, etc. are as follows.

Raw Materials (A) Polyamide Resin

Production Example 1 (A)-1: Polyamide 66

15,000 g of an equimolar salt of adipic acid and hexamethylenediamine, and 0.5 mol % excess of adipic acid relative to the entire equimolar salt component were dissolved in 15,000 g of distilled water, and a 50% by mass aqueous solution of a raw material monomer was obtained.

The obtained aqueous solution was charged in an autoclave having an internal volume of 40 liters, and the interior of the autoclave was replaced with nitrogen. While stirring this aqueous solution at a temperature within a range from 110 to 150° C., water vapor was gradually extracted to concentrate the solution until a solution concentration of 70% by mass was achieved. Thereafter, the internal temperature was raised to 220° C. At this time, the pressure in the autoclave was increased to 1.8 MPa. Water vapor was gradually extracted until the internal temperature reached 270° C., and reactions were carried out for 1 hour while maintaining the pressure at 1.8 MPa.

Thereafter, the pressure was reduced to atmospheric pressure over approximately 1 hour. After the pressure was reduced to atmospheric pressure, the polyamide was discharged in the form of a strand from a lower nozzle, and water cooling and cutting were performed to obtain pellets. The obtained pellets were dried in a nitrogen stream at 90° C. for 4 hours. The 98% sulfuric acid relative viscosity of these pellets was 2.71, the melting point was 265° C., and the crystallization temperature was 220° C.

Production Example 2 (A)-2: Polyamide 66

10 kg of the pellets obtained in the above Production Example 1 was placed in a conical ribbon vacuum dryer (by Okawara Seisakusho, product name Ribocone RM-10V) and thoroughly purged with nitrogen. Heating was carried out for six hours at a pellet temperature of 204° C. while stirring the pellets with nitrogen flowing at a rate of 1 liter per minute.

Thereafter, the temperature was lowered while the flow of nitrogen was continued, and the pellets were taken out of the apparatus when the temperature reached approximately 50° C. The relative viscosity of these pellets in 98% sulfuric acid was 4.1, the melting point was 262° C., and the crystallization temperature was 215° C.
(A)-3: Polyamide 6 [UBE Nylon 1013B by Ube Kosan] 98% sulfuric acid relative viscosity: 2.3, melting point: 220° C., crystallization temperature: 185° C.
(B) Fluorine Series Resin: Polytetrafluoroethylene
(B)-1 (PTFE-1): TLP10E-1 by Mitsui Dupont Fluorochemical, number average primary particle diameter: 0.2 μm, melting point: 329° C.
(B)-2 (PTFE-2): Lubron™ L-5F by Daikin Industries, number average primary particle diameter: 0.15 μm, melting point: 328° C.
(B)-3 (PTFE-3): Lubron LDW-410 by Daikin Industries, melting point: 328° C., number average primary particle diameter: 0.2 μm, water dispersed solution with a solid content of 40%
(B)-4 (PTFE-4): KTL-8N by Kitamura, number average primary particle diameter: 4.3 μm, melting point: 318° C.

Figure 2:
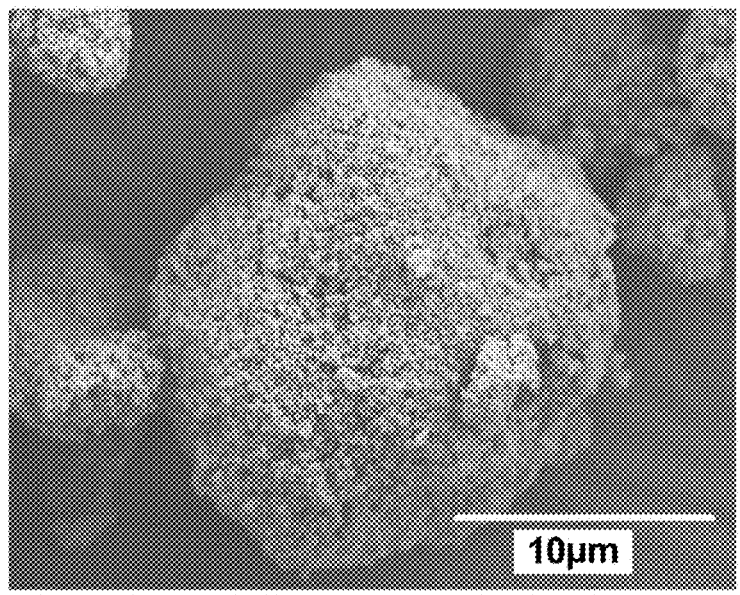
FIG. 2 is an SEM photograph that illustrates the particle form of polytetrafluoroethylene powders (PTFE-2) of an Example of the present disclosure.
Figure 3:
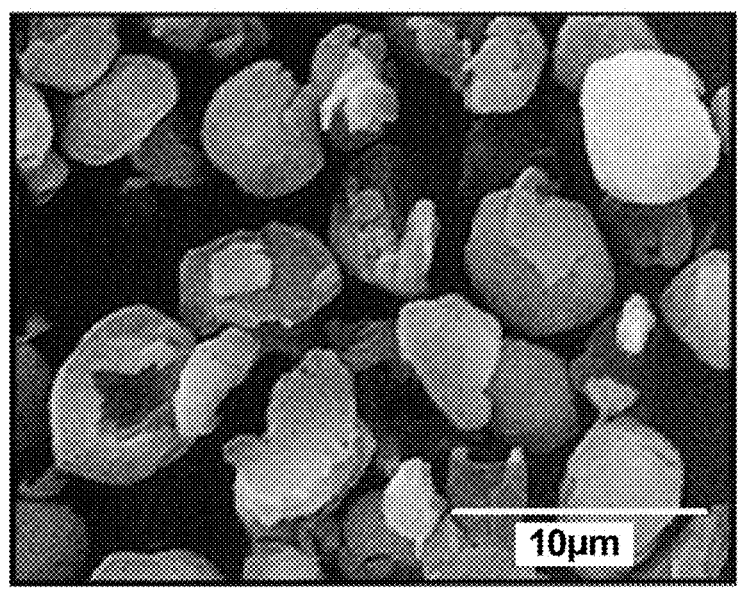
FIG. 3 is an SEM photograph that illustrates the particle form of polytetrafluoroethylene powders (PTFE-4) of a Comparative Example for the present disclosure.

FIG. 1 is an SEM photograph of (PTFE-1), FIG. 2 is an SEM photograph of (PTFE-2), and FIG. 3 is a SEM picture of (PTFE-4). As is clear from the SEM photographs, in (PTFE-1) and (PTFE-2), the powder had the shape of secondary particles while maintaining the primary particle form.
Copper Compound
(1) Copper Iodide: copper (I) iodide by Wako Pure Chemical Industries Metal halide
(1) Potassium Iodide: potassium iodide by Wako Pure Chemical Industries
[Molding Method]

The pellets of the compositions obtained in the Examples and Comparative Examples were molded into test pieces in the shape of an ISO 3167 type A multipurpose test piece, employing an injection molding apparatus PS-40E [by Nissei Resin] which was set to have an injection and holding time of 25 seconds, a cooling time of 15 seconds, a mold temperature of 80° C., and a cylinder temperature=(30° C. higher than the melting point of the polyamide resin).

In addition, the pellets of the compositions obtained in the Examples and Comparative Examples were injection molded with the above molding conditions to produce hollow cylindrical test pieces having outer diameters of 25.7 mm, inner diameters of 20 mm, and heights of 17 mm, thereby obtaining test pieces for evaluating sliding properties.
[Measurement Methods]
<Relative Viscosity in Sulfuric Acid>

The sulfuric acid relative viscosity ηr at 25° C. of the polyamide resin was measured according to JIS-K 6920. Specifically, a 98% sulfuric acid solution was employed to produce a 1% concentration solution (a ratio of (polyamide 1 g)/(98% sulfuric acid 100 mL)), and the relative viscosity in sulfuric acid ηr was measured at a temperature of 25° C. employing the obtained solution.
<Percentage of PTFE Particles Dispersed within Molded Body>

Figure 4:
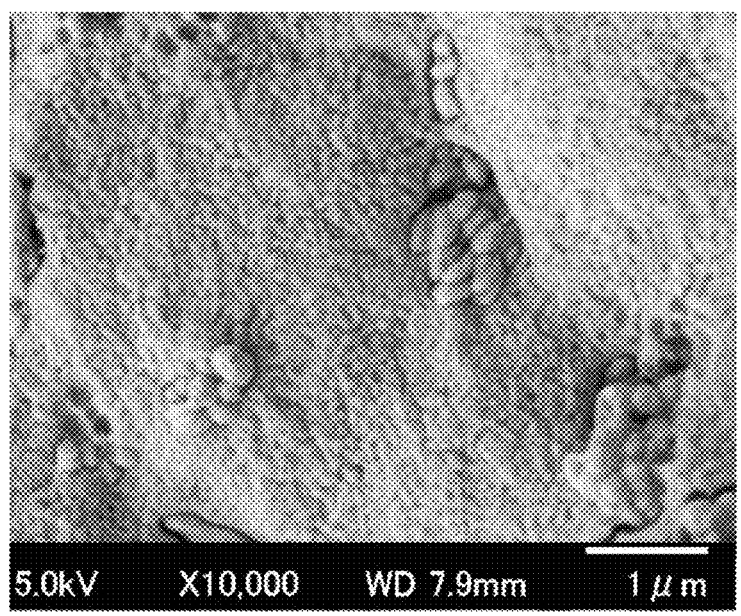
FIG. 4 is a SEM photograph for explaining PTFE particles having a secondary particle form which are dispersed in a molded body.

The type A multipurpose test pieces which were molded under the conditions described in [Molding Method] above were placed in liquid nitrogen, taken out after being sufficiently cooled, and then bent and broken at the center portion of the total lengths. Five arbitrary fields of view of the broken surfaces were photographed by a scanning electron microscope (SEM) at a magnification of 10,000×, and the number of particles having a particle diameter of 0.8 μm or more was counted. Among such particles, those which were two or more particles are aggregated without being bound were counted as "particles that are secondary particles while maintaining the form of the primary particles"="particles of the secondary particle form". The "number of particles having particle diameters of 0.8 μm or greater and are of the secondary particle shape"/"the total number of particles having particle diameters of 0.8 μm or greater" were calculated to determine the percentages of the number of particles having particle diameters of 0.8 μm or greater which had become secondary particles while maintaining the form of primary particles. When particles having particle diameters of 0.8 μm or greater were not observed, it was judged that "there are no particles 0.8 μm or larger". FIG. 4 is an SEM photograph (10,000× magnification) of a broken surface. The aggregated particles observed in the central part are not bound and the aggregated particles are "particles that are secondary particles while maintaining the form of the primary particles", that is, "particles of the secondary particle form".
<Degree of Crystallinity of PTFE Dispersed within Molded Body>

Central portion samples of the type A multipurpose test pieces molded under the conditions described in [Molding Method] above were measured with a differential scanning calorimeter (DSC) "Diamond DSC" (by Perkin Elmer Co.). Values obtained by dividing the value of the heat of fusion ΔH (J g) of the melting peak of the fluorine series resin which are obtained when raising the temperature from 50° C. to 350° C. at a rate of 20° C. per minute by the content (%) of fluorine series resin were designated as the degrees of crystallinity of the fluorine series resin in the molded bodies.

<Distance Among PTFE Particles Dispersed within Molded Body>

The surface layers of the type A multipurpose test pieces molded under the conditions described in [Molding Method] above were scraped off with a 18 μm microtome. Three arbitrary fields of view of the surfaces were photographed at a magnification of 5,000× with a scanning electron microscope (SEM), and image analysis software "Image J": free software was employed to measure the minimum distances among the centers of gravity for each particle, and the average value was designated as the distance among particles.

<Number Average Particle Diameter of PTFE Dispersed within Molded Body>

The type A multipurpose test pieces which were molded under the conditions described in [Molding Method] above were placed in liquid nitrogen, taken out after being sufficiently cooled, and then bent and broken at the center portion of the total lengths. Three arbitrary fields of view of the broken surfaces were photographed by a scanning electron microscope (SEM) at a magnification of 5,000×, the long diameters of observable particles were measured, dispersed particle diameter distributions were obtained, and the 50% cumulative values of the dispersed particle diameter distributions were designated as the number average particle diameter. At this time, particles which are aggregated primary particles having the secondary particle shape were counted as single particles.

<Percentage of the Number of PTFE Particles Dispersed within Molded Body Having Particle Diameters of 1.0 μm or Less>

The type A multipurpose test pieces which were molded under the conditions described in [Molding Method] above were placed in liquid nitrogen, taken out after being sufficiently cooled, and then bent and broken at the center portion of the total lengths. Three arbitrary fields of view of the broken surfaces were photographed by a scanning electron microscope (SEM) at a magnification of 5,000×, the long diameters of observable particles were measured, dispersed particle diameter distributions were obtained, the numbers of particles having particle diameters of 1.0 μm or less were counted, and the percentages of the number of particles having particle diameters of 1.0 μm or less with respect to the total number of particles were calculated.

<Evaluation of Sliding Properties>

Friction/Wear Tests

Structural carbon steel S45C which was cut and processed to have a diameter of 8 mm, a length of 22 mm, and a surface roughness of 5 μm was employed as paired members. These cylinders were arranged in a horizontal cruciform shape, the test pieces for evaluating sliding properties obtained as described in [Molding Method] were caused to contact the cruciform cylinders, then rotated with an applied load, to measure the coefficients of friction and amounts of wear (test conditions: rotary motion was conducted at an initial surface pressure of 8.6 MPa and a peripheral speed of 0.056 m/sec continued for 24 hours). Torque was measured according to JIS K 7218:1986 with a testing apparatus, and the measured torques were divided by the average radius of the test pieces for evaluating sliding properties and the applied pressure to obtain the coefficients of friction.

The mass Amg of the test pieces before the test was initiated measured to the first decimal place and the mass Bmg 24 hours after the end of the test was measured in the same manner, and the amounts of wear was obtained by subtracting B from A.

<Tensile Test>

The type A test pieces which were molded under the conditions described in [Molding Method] above from the compositions obtained in the Examples and Comparative Examples were subjected to a tensile test at a test speed of 50 mm/min according to ISO 527 to measure the tensile strengths thereof. In addition, the ratios of the amount of displacement between the chucks when the test pieces were broken with respect to the initial chuck distance prior to the tests being conducted were designated as the tensile elongations (%).

Tensile Elongation (%)=100·Amount of Displacement at Break/Initial Chuck Distance <Charpy Impact Strength>

The type A test pieces which were molded under the conditions described in [Molding Method] above from the compositions obtained in the Examples and Comparative Examples were processed into 80·10·4 mm pieces, and the notched Charpy impact strengths thereof (kJ/m$^2$) were measured according to ISO 179.

Example 1

A twin screw extruding apparatus having a screw diameter of 26 mm (product name "ZSK 26MC" by Copelion) was employed. A mixture, which is (A)-1 with a copper compound and a metal halide added thereto according to the blend composition shown in Table 1 was supplied by top feeding, a polytetrafluoroethylene powder was supplied by side feeding. Melt kneading was conducted under the extrusion conditions of the set temperatures shown in Table 1 with a screw rotation speed of 300 rpm, to obtain pellets of a polyamide resin composition. At this time, the position of the side feed at which the polytetrafluoroethylene powder was supplied was set to 7 barrels from the upstream end from among a total of 12 barrels.

The obtained polyamide resin composition pellets were employed to produce test pieces by the method described in [Molding Method] above, and each evaluation was conducted by the methods described in [Measurement Method] above.

Example 2

Example 2 was prepared in the same manner as Example 1, except that the polyamide resin was changed from (A)-1 to (A)-2, and that the set temperatures of the extruding apparatus were set higher as shown in Table 1.

Example 3

Example 3 was prepared in the same manner as Example 1, except that the polytetrafluoroethylene was changed from (B)-1 to (B)-2, and that the copper compound and the metal halide were not blended.

Example 4

Example 4 was prepared in the same manner as Example 1, except that the amount of the polytetrafluoroethylene powder (3)-1 in the blend was decreased, that the copper compound and the metal halide were not blended, and that the set temperatures were lowered.

Example 5

Example 5 was prepared in the same manner as Example 1, except that the amount of the polytetrafluoroethylene powder (B)-1 in the blend was increased, and that the copper compound and the metal halide were not blended.

Example 6

Example 6 was prepared in the same manner as Example 1, except that the polyamide resin was changed from (A)-1 to (A)-3, the amount of the polytetrafluoroethylene powder (B)-1 in the blend was increased, that the copper compound and the metal halide were not blended, and that the set temperatures of the extruding apparatus were lowered as shown in Table 1.

Example 7

Example 7 was prepared in the same manner as Example 4, except that the polytetrafluoroethylene was changed from (B)-1 to (B)-3, the (B)-3 water dispersed solution was added by a liquid jet nozzle provided at the downstream of the melting zone of the extruding apparatus, and that the set temperatures of the extruding apparatus were set higher as shown in Table 1. However, (B)-3 is a water dispersed solution that contains 40% polytetrafluoroethylene. Therefore, the amount of a solid component which was added was set to be the same as that of Example 4.

Example 8

10 kg of the pellets of the polyamide resin composition obtained in Example 1 was placed in a conical type ribbon vacuum dryer (by Okawara Seisakusho, product name Ribocone RM-10V) and thoroughly purged with nitrogen. Heating was carried out for six hours at a pellet temperature of 190° C. while stirring the pellets with nitrogen flowing at a rate of 1 liter per minute.

Thereafter, the temperature was lowered while the flow of nitrogen was continued, and the pellets were taken out of the apparatus when the temperature reached approximately 50° C. The relative viscosity of these pellets in 98% sulfuric acid was 4.0.

These pellets were employed to form a molded body and evaluations thereon were conducted in the same manner as Example 1.

Comparative Example 1

Comparative Example 1 was prepared in the same manner as Example 1, except that the screw rotation speed of the extruding apparatus was decreased.

Comparative Example 2

Comparative Example 2 was prepared in the same manner as Example 1, except that the feed position of the polytetrafluoroethylene powder (B)-1 was changed from side feeding to top feeding.

Comparative Example 3

Comparative Example 3 was prepared in the same manner as Example 1, except that the polytetrafluoroethylene powder was changed from (B)-1 to (B)-4.

Comparative Example 4

Comparative Example 4 was prepared in the same manner as Example 1, except that the set temperatures of the extruding apparatus were set higher.

Comparative Example 5

Molding and evaluation of a test piece were conducted without extruding (A)-1.

Comparative Example 6

Comparative Example 6 was prepared in the same manner as Example 5, except that the blended amount of the polytetrafluoroethylene powder (B)-1 was increased.

Comparative Example 7

Comparative Example 7 was prepared in the same manner as Example 6, except that the feed position of the polytetrafluoroethylene powder (B)-1 was changed from side feeding to top feeding.

The physical property values of Examples 1 through 8 and Comparative Examples 1 through 7 are shown in Tables 1 and 2 along with the compositions thereof.

TABLE 1

| | | | Example 1 | Example 2 | Example 3 | Example 4 | Example 5 | Example 6 | Example 7 | Example 8 |
|---|---|---|---|---|---|---|---|---|---|---|
| Composition | (A)-1 | parts by mass | 100 | — | 100 | 100 | 100 | — | 100 | 100 |
| | (A)-2 | parts by mass | — | 100 | — | — | — | — | — | — |
| | (A)-3 | parts by mass | — | — | — | — | — | 100 | — | — |
| | (B)-1 | parts by mass | 5 | 5 | — | 3 | 13 | 6 | — | 5 |
| | (B)-2 | parts by mass | — | — | 5 | — | — | — | — | — |
| | (B)-3 | parts by mass (as a solid) | — | — | — | — | — | — | 3 | — |
| | Copper Compound | parts by mass | 0.03 | 0.03 | — | — | — | — | — | 0.03 |
| | Metal Halide Compound | parts by mass | 0.3 | 0.3 | — | — | — | — | — | 0.3 |
| | (B) PTFE Primary Particle Diameter μm | | 0.2 | 0.2 | 0.15 | 0.2 | 0.2 | 0.2 | 0.2 | 0.2 |
| | (B) PTFE Feed Position | | Side | Side | Side | Side | Side | Side | Side | Side |
| Extrusion Conditions | Set Temperature ° C. | Up to Melting Zone | 280 | 300 | 280 | 270 | 280 | 250 | 280 | 280 |
| | | Melting Zone and Downstream Therefrom | 270 | 280 | 270 | 260 | 270 | 250 | 270 | 270 |
| | Screw Rotation Speed | rpm | 300 | 300 | 300 | 300 | 300 | 300 | 300 | 300 |
| | Resin Temperature | ° C. | 280 | 306 | 281 | 278 | 282 | 264 | 280 | 280 |
| Physical Properties | Degree of Crystallinity of PTFE within Polyamide (J/g) | | 49 | 46 | 49 | 51 | 50 | 52 | 53 | 49 |
| | Percentage of Dispersed PTFE Particles 0.8 μm or Larger having Secondary Particle Shapes while Maintaining Primary Particle Form (%) | | 90 | 72 | 89 | 92 | 88 | 93 | No Particles 0.8 μm or Larger | 90 |

TABLE 1-continued

| | | Example 1 | Example 2 | Example 3 | Example 4 | Example 5 | Example 6 | Example 7 | Example 8 |
|---|---|---|---|---|---|---|---|---|---|
| Distances Among PTFE Particles in Surface Layer of Molded Body (μm) | | 2.1 | 2.1 | 2.1 | 2.4 | 2.0 | 2.1 | 2.1 | 2.1 |
| PTFE Dispersed Particle Diameter Number Distribution within Molded Body | Number Average Particle Diameter (μm) | 0.28 | 029 | 0.28 | 0.28 | 0.31 | 0.23 | 0.22 | 0.28 |
| | Pecentage of Number of Particles 1.0 μm or Smaller (%) | 82 | 76 | 78 | 89 | 83 | 88 | 100 | 82 |
| Coefficient of Friction | | 0.3 | 0.28 | 0.31 | 0.34 | 0.29 | 0.35 | 0.27 | 0.28 |
| Amount of Wear | mg | 1.1 | 1.1 | 1.1 | 1.0 | 1.1 | 1.0 | 1.0 | 1.0 |
| Tensile Strength | MPa | 83 | 83 | 83 | 86 | 79 | 70 | 73 | 82 |
| Tensile Elongation | % | 13 | 12 | 12 | 11 | 13 | 18 | 19 | 13 |
| Charpy Impact Strength | kJ/m² | 5.1 | 5.0 | 4.9 | 4.8 | 5.4 | 6.8 | 7.0 | 5.3 |

TABLE 2

| | | | Comparative Example 1 | Comparative Example 2 | Comparative Example 3 | Comparative Example 4 |
|---|---|---|---|---|---|---|
| Composition | (A)-1 | parts by mass | 100 | 100 | 100 | — |
| | (A)-2 | parts by mass | — | — | — | 100 |
| | (A)-3 | parts by mass | — | — | — | — |
| | (B)-1 | parts by mass | 5 | 5 | — | 5 |
| | (B)-2 | parts by mass | — | — | — | — |
| | (B)-3 | parts by mass | — | — | — | — |
| | (B)-4 | parts by mass | — | — | 5 | — |
| | Copper Compound | parts by mass | 0.03 | 0.03 | 0.03 | 0.03 |
| | Metal Halide Compound | parts by mass | 0.3 | 0.3 | 0.3 | 0.3 |
| | (B) PTFE Primary Particle Diameter μm | | 0.2 | 0.2 | 4.3 | 0.2 |
| | (B) PTFE Feed Position | | Side | Top | Side | Side |
| Extrusion Conditions | Set Temperature ° C. | Up to Melting Zone | 280 | 280 | 280 | 320 |
| | | Melting Zone and Downstream Therefrom | 270 | 270 | 270 | 310 |
| | Screw Rotation Speed | rpm | 150 | 300 | 300 | 300 |
| | Resin Temperature | ° C. | 275 | 281 | 280 | 328 |
| Physical Properties | Degree of Crystallinity of PTFE within Polyamide (J/g) | | 51 | 39 | 35 | 49 |
| | Percentage of Dispersed PTFE Particles 0.8 μm or Larger having Secondary Particle Shapes while Maintaining Primary Particle Form (%) | | 92 | 3 | 0 | 48 |
| | Distances Among PTFE Particles in Surface Layer of Molded Body (μm) | | 3.3 | 4.2 | 4.2 | 4.1 |
| | PTFE Dispersed Particle Diameter Number Distribution within | Number Average Particle Diameter (μm) | 1.1 | 15.0 | 3.5 | 1.1 |
| | | Pecentage of Number of Particles 1.0 μm or Smaller (%) | 62 | 2.0 | 16.0 | 52.0 |
| | Coefficient of Friction | | 0.38 | 0.37 | 0.32 | 0.33 |
| | Amount of Wear | mg | 2.1 | 3.7 | 2.2 | 3.5 |
| | Tensile Strength | MPa | 85 | 83 | 83 | 82 |
| | Tensile Elongation | % | 11 | 13 | 12 | 12 |
| | Charpy Impact Strength | kJ/m² | 4.9 | 5.0 | 5.0 | 5.1 |

| | | | Comparative Example 5 | Comparative Example 6 | Comparative Example 7 |
|---|---|---|---|---|---|
| Composition | (A)-1 | parts by mass | 100 | 100 | — |
| | (A)-2 | parts by mass | — | — | — |
| | (A)-3 | parts by mass | — | — | 100 |
| | (B)-1 | parts by mass | — | 20 | 6 |
| | (B)-2 | parts by mass | — | — | — |
| | (B)-3 | parts by mass | — | — | — |
| | (B)-4 | parts by mass | — | — | — |
| | Copper Compound | parts by mass | — | — | — |
| | Metal Halide Compound | parts by mass | — | — | — |
| | (B) PTFE Primary Particle Diameter μm | | — | 0.2 | 0.2 |
| | (B) PTFE Feed Position | | — | Side | Top |
| Extrusion Conditions | Set Temperature ° C. | Up to Melting Zone | — | 280 | 250 |
| | | Melting Zone and Downstream Therefrom | — | 270 | 250 |
| | Screw Rotation Speed | rpm | — | 300 | 300 |
| | Resin Temperature | ° C. | — | 283 | 263 |
| Physical Properties | Degree of Crystallinity of PTFE within Polyamide (J/g) | | — | 50 | 39 |

TABLE 2-continued

| | | | | |
|---|---|---|---|---|
| Percentage of Dispersed PTFE Particles 0.8 μm or Larger having Secondary Particle Shapes while Maintaining Primary Particle Form (%) | | — | 78 | 46 |
| Distances Among PTFE Particles in Surface Layer of Molded Body (μm) | | — | 2.1 | 4.1 |
| PTFE Dispersed Particle Diameter Number Distribution within | Number Average Particle Diameter (μm) | — | 0.4 | 8.7 |
| | Pecentage of Number of Particles 1.0 μm or Smaller (%) | — | 73.0 | 3.0 |
| Coefficient of Friction | | 0.39 | 0.28 | 0.37 |
| Amount of Wear | mg | 1.2 | 3.8 | 1.6 |
| Tensile Strength | MPa | 86 | 72 | 71 |
| Tensile Elongation | % | 5 | 14 | 26 |
| Charpy Impact Strength | kJ/m² | 5.1 | 5.7 | 6.9 |

As is clear from the results of the Examples shown in Table 1, the polyamide resin molded bodies of the present disclosure exhibited superior balance among sliding properties (coefficient of friction, amount of wear), toughness, and impact resistance.

Meanwhile, as is clear from the results of the Comparative Examples shown in Table 2, polyamide resin molded bodies outside the scope of the polyamide resin molded body of the present disclosure exhibited deterioration in at least one of sliding properties (coefficient of friction, amount of wear), toughness, and impact resistance.

INDUSTRIAL APPLICABILITY

The polyamide resin molded body of the present disclosure has superior sliding properties and mechanical properties. Therefore, there are possibilities for industrial utilization in the automotive field, the electric and electronics fields, the machine and industrial fields, the office appliance field, the aeronautic field, the aerospace field, etc.

The invention claimed is:

1. A polyamide resin molded body formed by a resin composition comprising:
   a (A) polyamide resin; and
   a (B) fluorine series resin being particles dispersed in the (A) polyamide resin;
   wherein
   the content of the (B) fluorine series resin being from 1 to 15 parts by mass with respect to 100 parts by mass of the (A) polyamide resin;
   the number average particle diameter of the (B) fluorine series resin particles being 0.8 μm or less and at least one of (i) and (ii) is satisfied:
   (i) particles having particle diameters of 0.8 μm or greater of the dispersed fluorine resin particles (B) being one or more selected from the group consisting of primary particles, secondary particles aggregated and maintained in the form of primary particles, and secondary particles aggregated and not maintained in the form of primary particles, and numerically consisting of no less than 60% of secondary particles aggregated and maintained in the form of primary particles,
   (ii) the degree of crystallinity of the dispersed (B) fluorine series resin being 42 J/g or greater.

2. The polyamide resin molded body as defined in claim 1, wherein:
   the distances between adjacent particles of the (B) fluorine series resin particles are 3 μm or less.

3. The polyamide resin molded body as defined in claim 1, wherein:
   the (B) fluorine series resin is polytetrafluoroethylene.

4. The polyamide resin molded body as defined in claim 1, wherein:
   the (B) fluorine series resin particles have a number average primary particle diameter within a range from 0.1 to 0.8 μm.

5. The polyamide resin molded body as defined in claim 1, wherein:
   the number of particles having particle diameters of 1.0 μm or less is 70% or greater.

6. The polyamide resin molded body as defined in claim 1, wherein:
   the (A) polyamide resin is a polyamide resin having a polyamide selected from a group consisting of polyamide 66, polyamide 6, polyamide 610, and polyamide 612 as its principal component.

7. The polyamide resin molded body as defined in claim 1, wherein:
   the relative viscosity in sulfuric acid of the (A) polyamide resin is within a range from 3.2 to 4.5.

8. The polyamide resin molded body as defined in claim 2, wherein:
   the (B) fluorine series resin is polytetrafluoroethylene.

9. The polyamide resin molded body as defined in claim 2, wherein:
   the (B) fluorine series resin particles have a number average primary particle diameter within a range from 0.1 to 0.8 μm before being dispersed in the (A) polyamide resin.

10. The polyamide resin molded body as defined in claim 2, wherein:
    the number of particles having particle diameters of 1.0 μm or less is 70% or greater.

11. The polyamide resin molded body as defined in claim 2, wherein:
    the (A) polyamide resin is a polyamide resin having a polyamide selected from a group consisting of polyamide 66, polyamide 6, polyamide 610, and polyamide 612 as its principal component.

12. The polyamide resin molded body as defined in claim 2, wherein:
    the relative viscosity in sulfuric acid of the (A) polyamide resin is within a range from 3.2 to 4.5.

13. The polyamide resin molded body as defined in claim 3, wherein:
    the (B) fluorine series resin particles have a number average primary particle diameter within a range from 0.1 to 0.8 μm before being dispersed in the (A) polyamide resin.

14. The polyamide resin molded body as defined in claim 3, wherein:
the number of particles having particle diameters of 1.0 µm or less is 70% or greater.

15. The polyamide resin molded body as defined in claim 3, wherein:
the (A) polyamide resin is a polyamide resin having a polyamide selected from a group consisting of polyamide 66, polyamide 6, polyamide 610, and polyamide 612 as its principal component.

16. The polyamide resin molded body as defined in claim 3, wherein:
the relative viscosity in sulfuric acid of the (A) polyamide resin is within a range from 3.2 to 4.5.

17. The polyamide resin molded body as defined in claim 4, wherein:
the (B) fluorine series resin particles have a number average primary particle diameter within a range from 0.1 to 0.8 µm before being dispersed in the (A) polyamide resin.

18. The polyamide resin molded body as defined in claim 4, wherein:
the number of particles having particle diameters of 1.0 µm or less is 70% or greater.

19. The polyamide resin molded body as defined in claim 4, wherein:
the (A) polyamide resin is a polyamide resin having a polyamide selected from a group consisting of polyamide 66, polyamide 6, polyamide 610, and polyamide 612 as its principal component.

20. The polyamide resin molded body as defined in claim 4, wherein:
the relative viscosity in sulfuric acid of the (A) polyamide resin is within a range from 3.2 to 4.5.

* * * * *